(12) United States Patent
Kerr et al.

(10) Patent No.: US 7,898,397 B2
(45) Date of Patent: Mar. 1, 2011

(54) SELECTIVELY ADJUSTABLE ICONS FOR ASSISTING USERS OF AN ELECTRONIC DEVICE

(75) Inventors: Duncan R Kerr, San Francisco, CA (US); Nicholas V King, San Jose, CA (US); Peter H Mahowald, Los Altos, CA (US); Derek J DiCarlo, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 274 days.

(21) Appl. No.: 11/818,089

(22) Filed: Jun. 12, 2007

(65) Prior Publication Data

US 2008/0309511 A1   Dec. 18, 2008

(51) Int. Cl.
  *H04B 3/36* (2006.01)
  *G08B 6/00* (2006.01)
  *G08B 21/00* (2006.01)
  *G09B 21/00* (2006.01)
  *G06F 3/01* (2006.01)

(52) U.S. Cl. .................. 340/407.2; 340/687; 715/702

(58) Field of Classification Search .... 340/568.1–572.9, 340/686.1, 687, 686.6, 500, 505, 531, 532, 340/691.6, 407.1, 407.2, 669; 715/763, 762, 715/702; 710/100, 302; 324/538
See application file for complete search history.

(56) References Cited

U.S. PATENT DOCUMENTS

| | | | | |
|---|---|---|---|---|
| 4,833,456 A | * | 5/1989 | Heller | 340/571 |
| 5,179,343 A | * | 1/1993 | Chishima et al. | 324/538 |
| 5,630,081 A | * | 5/1997 | Rybicki et al. | 715/839 |
| 5,910,776 A | * | 6/1999 | Black | 340/10.1 |
| 6,138,194 A | * | 10/2000 | Klein et al. | 710/302 |
| 6,223,218 B1 | * | 4/2001 | Iijima et al. | 709/221 |
| 6,229,538 B1 | * | 5/2001 | McIntyre et al. | 715/734 |
| 6,462,668 B1 | * | 10/2002 | Foseide | 340/687 |
| 6,768,314 B2 | * | 7/2004 | Shimizu et al. | 324/538 |
| 6,781,570 B1 | * | 8/2004 | Arrigo et al. | 345/158 |
| 6,784,802 B1 | * | 8/2004 | Stanescu | 340/687 |
| 6,928,504 B2 | * | 8/2005 | Peacock | 710/302 |
| 7,190,264 B2 | * | 3/2007 | Brown et al. | 340/539.23 |
| 7,279,970 B2 | * | 10/2007 | Yokoyama et al. | 330/99 |
| 7,319,404 B2 | * | 1/2008 | Sturges et al. | 340/635 |
| 7,573,383 B2 | * | 8/2009 | Yun et al. | 340/540 |
| 7,605,707 B2 | * | 10/2009 | German et al. | 340/572.8 |
| 2008/0092069 A1 | * | 4/2008 | Chan et al. | 715/763 |
| 2008/0157978 A1 | * | 7/2008 | Kotzin et al. | 340/572.8 |

FOREIGN PATENT DOCUMENTS

EP         1000638 A2 *   5/2000

* cited by examiner

*Primary Examiner* — Jennifer Mehmood
(74) *Attorney, Agent, or Firm* — Kramer Levin Naftalis & Frankel LLP

(57) ABSTRACT

Systems and methods for providing selectively adjustable icons to assist users of an electronic device are provided. Icons can be selectively adjusted to assist users in connecting and disconnecting accessories to and from the electronic device.

34 Claims, 10 Drawing Sheets

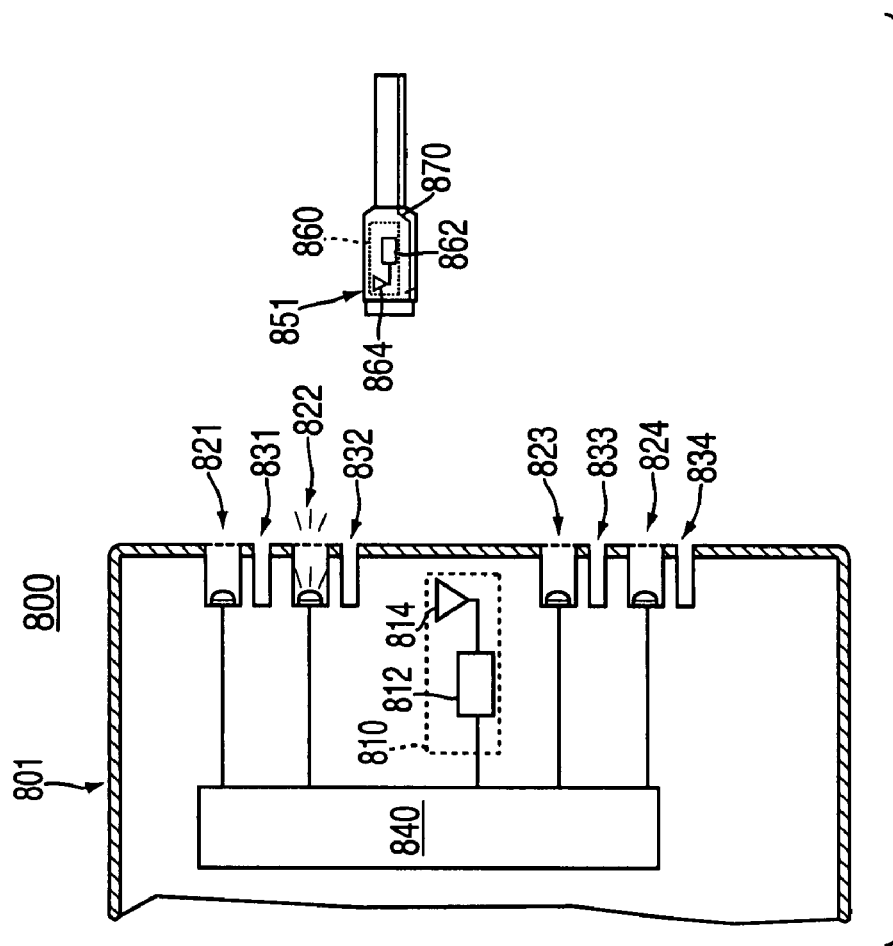
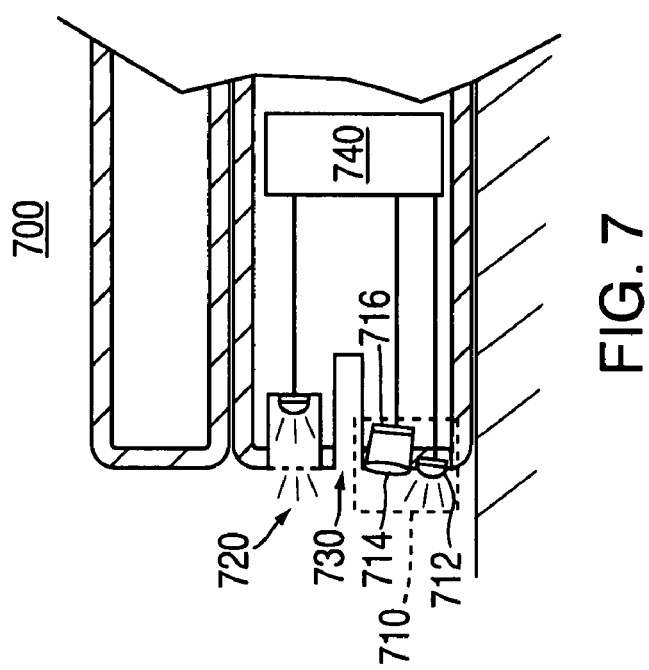

1000

1010 — Determining that a port event related to a port on an electronic device is occurring 1020 — Adjusting one or more icons on the electronic device in response to determining that a port event related to a port on the electronic device is occurring

FIG. 10

SELECTIVELY ADJUSTABLE ICONS FOR ASSISTING USERS OF AN ELECTRONIC DEVICE

FIELD OF THE INVENTION

In one embodiment, the present invention relates to apparatus and methods for assisting users when interfacing with electronic devices.

BACKGROUND OF THE INVENTION

Many electronic devices (e.g., desktop computers, laptop computers, portable media players, telephones) can be coupled to various accessories (e.g., printers, external storage devices, speakers) at various times during use. These electronic devices can have one or more ports for providing an electrical connection to these accessories. Each of these ports can be identified by an icon adjacent thereto (e.g., a static symbol representative of the type of accessory that can be coupled to its respective port).

One or more ports can be substantially similar to other ports such that it is difficult for a user to distinguish between the ports. Additionally, ports can be located on parts of an electronic device that may not receive adequate light for distinguishing between the different icons associated with the ports (e.g., ports and icons on the back of a computer display). Because of each of the factors discussed above, among others, a user can experience difficulty when coupling an accessory to a port.

Accordingly, it would be desirable to provide an electronic device that selectively adjusts icons based on the current state of the electronic device.

SUMMARY OF THE INVENTION

A method for assisting a user of an electronic device having a port and an icon is provided. The method can include determining that a port event related to the port is occurring. The method can also include adjusting the icon in response to the determining.

An electronic device that includes one or more ports and one or more icons is provided. The electronic device can also include sensor circuitry operable to detect a port event related to at least one of the one or more ports. The electronic device can also include control circuitry coupled to the one or more icons and the sensor circuitry, wherein the control circuitry is operable to adjust at least one of the one or more icons in response to the port event detected by the sensor circuitry.

A system for assisting a user of an electronic device is provided. The system can include an accessory and an electronic device. The electronic device can include one or more ports and one or more icons. The electronic device can also include sensor circuitry operable to determine that a user is attempting to connect or disconnect the accessory to or from at least one of the one or more ports. The electronic device can also include control circuitry coupled to the one or more icons and the sensor circuitry, wherein the control circuitry is operable to adjust at least one of the one or more icons in response to the determination of the sensor circuitry.

BRIEF DESCRIPTION OF THE DRAWINGS

The above and other features of the present invention, its nature and various advantages will be more apparent upon consideration of the following detailed description, taken in conjunction with the accompanying drawings, in which like reference characters refer to like parts throughout, and in which:

FIG. 7 is a simplified cross-sectional view of a portion of an electronic device in accordance with one embodiment of the present invention;

FIG. 8 is a simplified cross-sectional view of an illustrative electronic system that includes both an electronic device and an accessory in accordance with one embodiment of the present invention;

FIG. 10 shows an illustrative flowchart for assisting a user of an electronic device in accordance with one embodiment of the present invention.

DETAILED DESCRIPTION OF THE INVENTION

Figure 1:
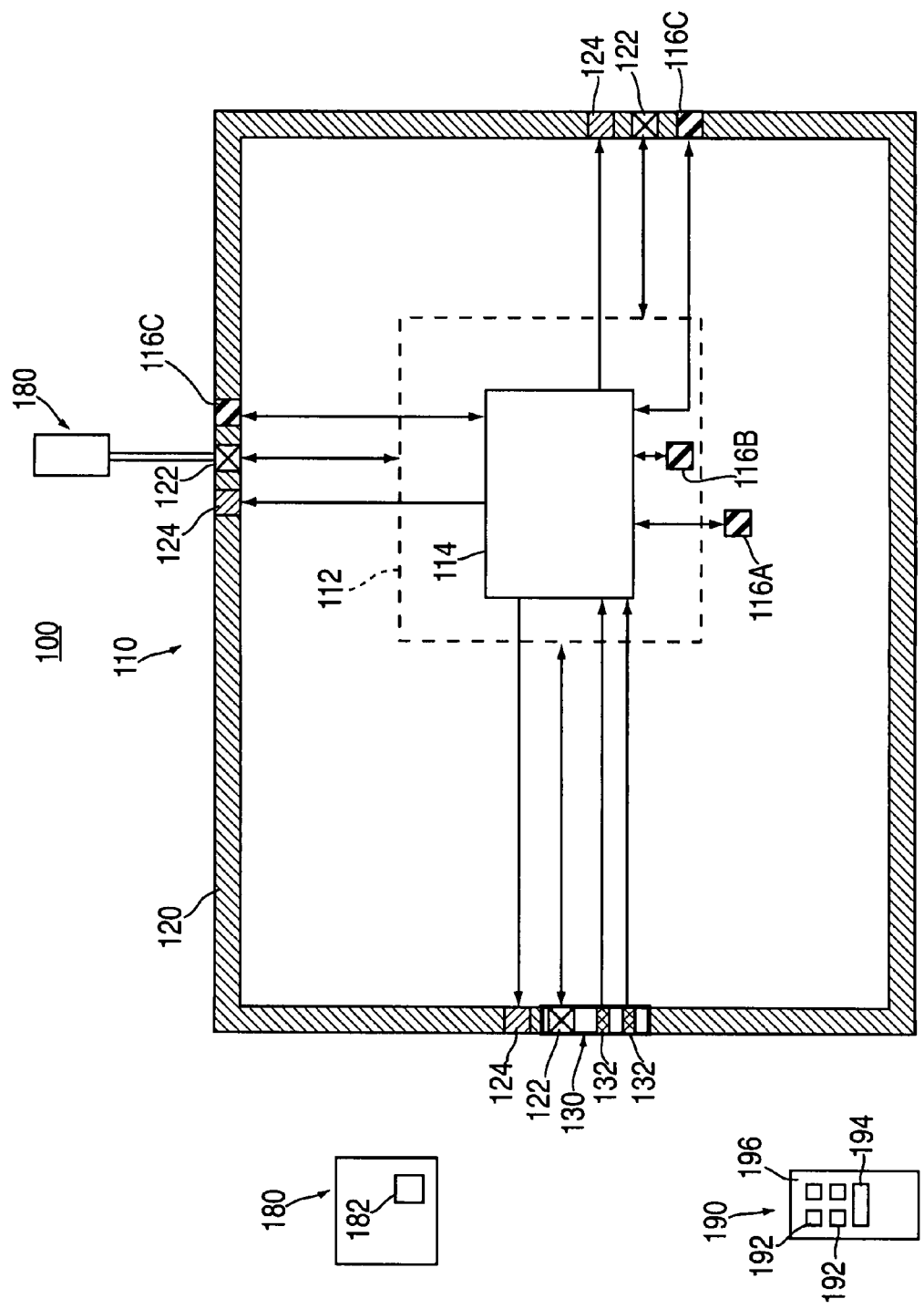
FIG. 1 is a simplified schematic view of an electronic system in accordance with various embodiments of the present invention.

In accordance with the present invention, an electronic device with selectively adjustable icons for assisting users is provided. In one embodiment, the adjustable icons can assist a user in connecting and disconnecting accessories to and from the electronic device. Icons can be associated with ports where accessories can connect to the electronic device via the ports.

The terms "electronic device," "accessory," and "port" are used in the context of an electronic system in accordance with the present invention. The term "electronic device" is used herein to refer to any electronic device with one or more "ports" (see below). For example, an electronic device can be a computer, a portable media player, a telephone, a DVD player, or a television. In some embodiments, electronic devices may be embedded in a system that is not predominantly electronic (e.g., an entertainment device incorporated into an automobile or a control panel for a medical instrument).

The term "accessory" is used herein to refer to any object that can connect to an electronic device. For example, an accessory can be a cable, a user input mechanism (e.g., a mouse or a keyboard), an auxiliary storage device (e.g., an external hard drive), or a printer. An accessory can also be another electronic device that can connect to the previously defined electronic device.

As used herein, the term "port" refers to a portion of an electronic device, the portion including an electrical connector for coupling with an accessory or another electronic device, a mechanism for receiving media (e.g., an aperture for accepting a compact disc), or a mechanism for receiving a consumable (e.g., batteries, dish-washer detergent, coffee beans, etc.). A port may be associated with a control mechanism (e.g., a button that ejects media or connectors from the port) and/or an icon that identifies the port. In some embodiments, an icon may be a graphical display in proximity to the associated port or may be an indicator integral to the associated port (e.g., a light source that illuminates part of the connector or mechanism).

It is to be understood that the electronic devices, accessories, and ports described herein are merely exemplary and that various other electronic devices, accessories, and ports can be used without deviating from the spirit and scope of the present invention.

The phrase "port event" is used herein to refer to any activity that is related to a port on an electronic device. For example, a "port event" can include, but is not limited to, when a port's status changes, when a port's parameters exceed a predetermined threshold, when a user attempts to connect or disconnect an accessory to or from a port, when the status of an accessory connected through a port changes, when a user attempts to provide a port with media or a consumable, and when a device needs a user to provide a port with media or a consumable. Upon detection of any of these exemplary port events, a system can assist a user by selectively adjusting an icon associated with the corresponding port.

An electronic device that selectively adjusts icons based on the current state of the electronic device is provided. The electronic device can be provided with one or more ports and can determine when a port event related to the one or more ports occurs. In response to determining that a port event has occurred, the electronic device can selectively adjust one or more icons. Various mechanisms can be used not only to determine when a port event is occurring, but also to thereby change the state of the device based on that determination.

In accordance with one embodiment of the present invention, an electronic device can be configured to accept an instruction, command, or notification from a user that can indicate that a port event is occurring. For example, such an instruction can explicitly notify the electronic device that the user is attempting to connect or disconnect an accessory (e.g., a user explicitly notifying the device that they are going to connect or disconnect an accessory). Alternatively, such an instruction can imply that a user is attempting to connect an accessory by indicating that the user is performing an activity that typically involves an accessory. For example, if the electronic device is a computer and the user is attempting to execute software that requires a particular type of accessory, the device can determine that the user is attempting to connect that accessory. A remote control can be provided for accepting such an instruction, command, or notification from a user, for example.

In another embodiment of the present invention, an electronic device can be provided with one or more sensors that can determine when the device is being moved in a manner indicative that a port event is occurring. In yet another embodiment, an electronic device can be provided with one or more sensors that can detect what a user's attention is directed to such that the device can determine that a port event is occurring. For example, a device can monitor what a user's eyes are pointed at to determine if the user is focused on a port. In another embodiment, proximity detectors can be used to determine when a port event is occurring. A proximity sensor can, for example, detect when a user's hands or an accessory are proximal to a port. This information can be used to determine that the user is attempting to connect or disconnect an accessory to or from that port. In another embodiment, an accessory can broadcast an identification code that can indicate what type of port it can connect to. When the accessory comes within range of an electronic device, a proximity sensor can receive this code and determine that the user is attempting to connect the accessory. The identification code can be communicated using, for example, a Radio Frequency Identification (RFID) system or any other wireless communications system.

In response to determining that a port event is occurring, one or more icons can be selectively adjusted. For example, when a user is attempting to connect or disconnect an accessory to or from an electronic device, an icon can be adjusted to draw the user's attention to the appropriate port for the accessory. This adjustment can assist the user in locating a port and thereby save the user time.

Icons can be selectively adjusted in a manner that changes the appearance of the icons. For example, icons can be adjusted by varying the amount of illumination or the color of illumination. Icons can be cyclically adjusted so that the same adjustment may be repeated multiple times (e.g., an icon can blink on and off).

For example, as shown in FIG. 1, system 100 can include electronic device 110 and any number of accessories 180. Electronic device 110 may include processor circuitry 112 for coordinating the activities of the device. Processor circuitry 112 can, for example, include a processor, a field-programmable gate array, an application-specific integrated circuit, or a combination of individual logic components.

Electronic device 110 may be provided with housing 120 for enclosing processor circuitry 112 and any other internal parts of the device. Housing 120 can be provided with one or more ports 122. Each of ports 122 can provide an electrical connection between one or more types of external accessories 180 and processor circuitry 112 of device 110. Housing 120 can also be provided with one or more icons 124. Each of the icons 124 may be associated with one or more of ports 122, by proximity, for example. An icon can also be associated with one or more ports by visually representing the function of those ports. Icons 124 can be adjustable such that the appearance of the icons can change. For example, icons 124 can each include a light source that can emit a varying amount of light. Icons 124 can receive one or more electrical signals that instruct each icon how and when to adjust.

Processor circuitry 112 can include detection and control circuitry 114. Detection and control circuitry 114 can be provided in one common circuit or can be provided in separate detection circuitry and control circuitry that are coupled together. Any portion of detection and control circuitry 114 can be located in circuitry external or integral to processor circuitry 112.

Detection circuitry 114 can determine when a port event is occurring that is related to the one or more ports 122. To identify port events, detection circuitry 114 can be coupled to one or more detectors of various types (e.g., device movement detectors 116A, function detectors 116B, user/accessory proximity detectors 116C, etc.). Detectors 116 can be located in the interior of device 110, incorporated into housing 120, or mounted on an external surface of housing 120. For example, function detectors 116B can be integrated into processor circuitry 112 such that function detectors 116B can monitor the state of device 110, and proximity detectors 116C can be incorporated into housing 120 in an area near one or more of ports 122.

In response to circuitry 114 determining that a port event is occurring, circuitry 114 can adjust one or more of icons 124 to assist a user. If circuitry 114 has determined that a port event is related to a specific one or more of ports 122, circuitry 114 can selectively adjust only the icons associated with that one or more ports. If circuitry 114 has determined that a port event may be related to all of ports 122, circuitry 114 can selectively adjust all of the icons associated with ports 122. Circuitry 114 can adjust icons 124 by modifying one or more electrical signals that control icons 124. For example, modifying an electrical signal can result in a change in the intensity of light used to illuminate one or more of icons 124.

FIGS. 2A-2I show various icons 21-27 that can be selectively adjusted in accordance with the present invention. Icons 21-27 can be provided on electronic devices in such a way that each icon is associated with a port. Icon 21 can graphically represent a power connection and can be associated with a port for receiving a power cable. Icon 22 can graphically represent a Universal Serial Bus (USB) connection and can be associated with a port for receiving a USB cable. Icon 23 can graphically represent an audio input connection and can be associated with a port for receiving an audio cable. Icon 24 can graphically represent a headphone connection and can be associated with a port for receiving a headphone cable. Icon 25 can graphically represent a Firewire connection and can be associated with a port for receiving a Firewire cable. Icon 26 can graphically represent an Ethernet connection and can be associated with a port for receiving an Ethernet cable. Icon 27 can graphically represent a video connection and can be associated with a port for receiving a video cable.

Icon 28 is an example of an icon that may be integral to the associated port. For example, icon 28 may involve illuminating rim 281 that surrounds the associated port. Icon 29 is another example of an icon that may be integral to the associated port. In this embodiment, icon 29 may involve illuminating a light source (not shown) inside of the associated port such that the associated port emits light from aperture 292 that is also used to receive a connector. In icon 29, rim 291 that surrounds the associated port may also be illuminated.

While FIGS. 2A-2I show various exemplary icons, it is to be understood that there are many different icon designs that can be used without deviating from the spirit and scope of the present invention. For example, an audio amplifier with a set of input ports might have a particular set of icons to identify the various types of input that it can accept (e.g., a CD player input, a satellite radio input, or an auxiliary input).

In accordance with the principles of the present invention, various types of adjustable icons can be used to assist users. In one embodiment, icons can be provided in the housing of the electronic device by microperforations that may be arranged to form a particular design. These microperforations can be illuminated from within the housing to create the effect of a glowing icon. However, the microperforations can be of a sufficiently small enough size that they are indistinguishable to the human eye when not illuminated. A detailed description of such microperforations and their fabrication can be found in commonly assigned Andre et al. U.S. patent application Ser. No. 11/456,833, filed Jul. 11, 2006, entitled "Invisible, Light-Transmissive Display System," and commonly assigned Andre et al. U.S. patent application Ser. No. 11/551, 988, filed Oct. 23, 2006, entitled "Invisible, Light-Transmissive Display System," each of which is hereby incorporated by reference herein in its entirety.

In another embodiment, each adjustable icon can be one or more shaped apertures in the housing of an electronic device. These apertures can be filled with a translucent material such that, when illuminated from behind (i.e., from within the housing), the apertures may appear as glowing icons. In yet another embodiment, an adjustable icon can be opaque details on a translucent window. The window can be illuminated from behind (i.e., from within the housing) to make the icon appear as a dark figure in the window. In another embodiment, an adjustable icon can be a light source provided inside or about a port or socket of an electronic device.

In yet another embodiment, adjustable icons can be images generated by reflective display systems. The reflective properties of such icons can be selectively adjusted to change the way that ambient light is reflected to a user. Such reflective icons may consume less energy than other types of icons because they may not need to illuminate themselves. This efficiency can be advantageous in portable, battery-powered electronic devices. Suitable reflective display systems for generating such adjustable icons can include, for example, flip card systems (i.e., systems that include two or more panels which can be selectively displayed) and Electronic Paper Displays (EPDs) such as those made by E Ink Corporation of Cambridge, Mass.

It is to be understood that the types of adjustable icons described above are provided merely for purposes of illustration and not limitation. Other types of icons can be used without deviating from the spirit and scope of the present invention. For example, icons that are displayed on a liquid crystal display screen can be selectively adjusted in accordance with the principles of the present invention.

In accordance with one embodiment of the present invention, an electronic device can selectively adjust one or more icons to assist a user when using or interfacing with the device. The icons can be selectively adjusted to provide helpful information about the electronic device. The icon can be indicative of, for example, the current state or mode of the device. Moreover, in certain embodiments, an icon proximal to a specific port can be indicative of the status of that port or an accessory connected to that port. If a port has more than one function, an icon associated with that port may be adjusted in such a way that the icon represents the current function of that port. This type of selective icon adjustment can assist a user when using the device.

Icons can also be selectively adjusted to assist a user in connecting or disconnecting accessories to or from an electronic device. If an icon is associated with a port that a user may want to connect an accessory to, the icon can be adjusted to draw a user's attention to that port. Techniques used to determine when a user may want to connect an accessory to or disconnect an accessory from a particular port are described below in more detail with respect to FIGS. 6-9, for example.

In accordance with various embodiments of the present invention, icons can be selectively adjusted by varying the light emitted from one or more light sources. The one or more light sources can include, but are not limited to, light emitting diodes (LEDs), incandescent bulbs, and fluorescent bulbs. Light sources can be placed behind an icon (from a user's vantage point) such that the light source shines through the icon towards the user, for example. Circuitry in the electronic device can be used to power and control the light source (as described in connection with FIG. 1, for example). A device can include one or more icons and each icon can include one or more light sources. For example, a device can include five icons, and each icon can include two LEDs. Light sources and any accompanying circuitry can be electrically coupled to control circuitry of the electronic device that can determine when and how an icon is illuminated (see, e.g., control circuitry 114 and icons 124 of FIG. 1).

An icon can also be selectively adjusted by changing the specific amount of light (e.g., brightness or intensity) used to illuminate the icon. The brightness of each light source can be selectively adjusted such that an icon's appearance can range from unilluminated to fully illuminated, including numerous levels in between. When an icon is unilluminated it may be undetectable to the human eye, as in the case of microperforation icons. Alternatively, an icon with no illumination may be visible to a user but not noticeably active. Icons can be partially illuminated by varying an electrical signal used to control a light source that illuminates the icon (see, e.g., control circuitry 114 and icons 124 of FIG. 1). Depending on the type of light source used and any accompanying circuitry (e.g., shunt resistors), the voltage, current, or duty-cycle of an electrical signal can be varied to change the brightness of the light source and, thus, the amount that an icon is illuminated.

Figure 2A:
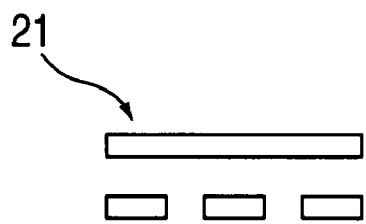
FIGS. 2A-2I are illustrations of adjustable icons in accordance with various embodiments of the present invention.
Figure 2B:
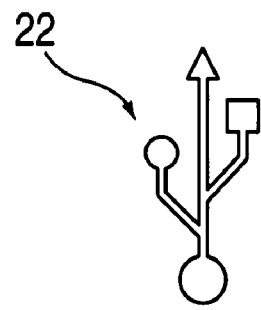
Figure 2C:
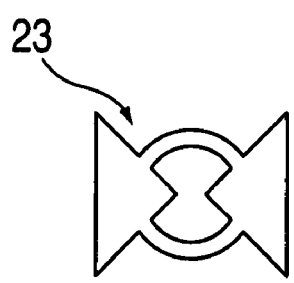
Figure 2D:
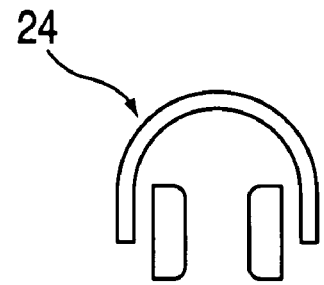
Figure 2E:
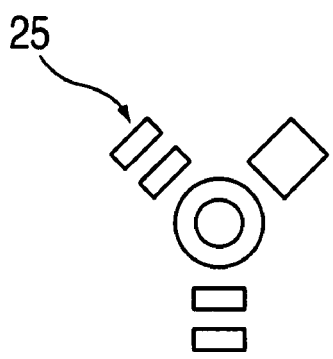
Figure 2F:
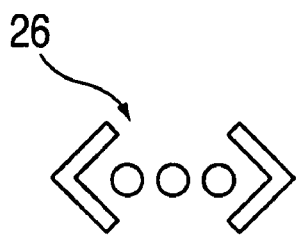
Figure 2G:
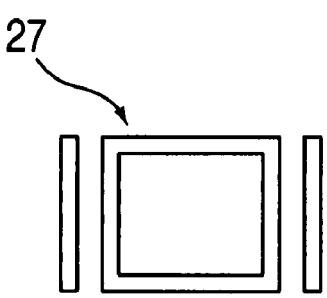
Figure 2H:
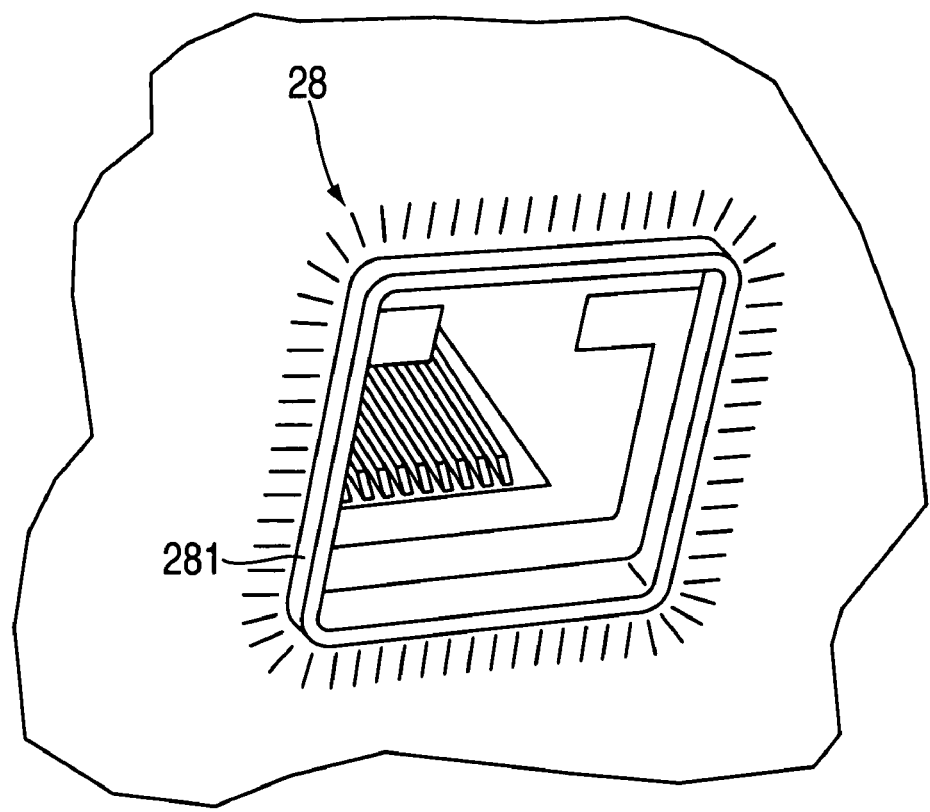
Figure 2I:
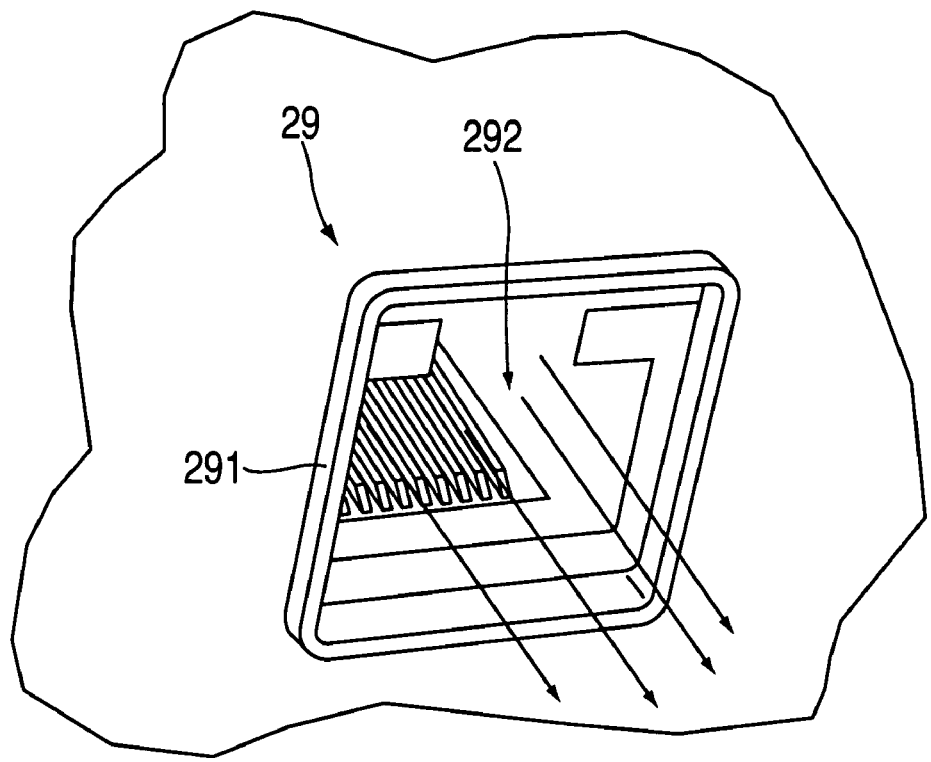

An icon can be selectively adjusted by using different colors of light to illuminate the icon. The color of an icon can represent, for example, the status or mode of the electronic device, one of its ports, or an accessory connected to one of its ports. For example, if icon 23 of FIG. 2C is green, it can signify that an audio port is enabled, and if the icon is red, it can signify that an audio port is disabled or muted. Moreover, the color of an icon can represent the status of signals being transmitted through a port associated with that icon. For example, if icon 23 of FIG. 2C is green, it can signify that an associated audio port is receiving an active audio signal, and if the icon is red, it can signify that an associated audio port is receiving a silent or static signal.

Multiple light sources of different colors can be selectively activated to illuminate an icon with different colors. Each differently colored light source can be independently activated to illuminate an icon or a portion of an icon with that color. Additionally, the light sources used to illuminate an icon can be activated in combination to illuminate an icon with a blend of different colors. This blend of light can be perceived as a single color by a user. To create a specific color through blending, each source can be activated to produce colored light of a predetermined brightness. For example, red, green, and blue light sources can be used together to illuminate an icon with a substantially large range of colors.

Icons can also be selectively adjusted by changing their reflective properties. An icon can appear differently to a user after its reflective properties have been changed. For example, the reflective properties of an Electronic Paper Display (EPD) icon can be changed so that it appears as a different icon design or no icon at all (i.e., blank). The design of an icon associated with a port can change to signify a change in the function of that port, for example.

In accordance with one embodiment of the present invention, an icon can be adjusted by changing the shape of the icon. Primary icons, such as those shown in FIGS. 2A-2I, can be selectively adjusted so that they change to differently shaped icons by adding icon portions 31-34 in FIGS. 3A-3C, for example. An icon's shape can change, for example, by activating one or more additional light sources. Changing the shape of an icon can convey information about a device to a user. In the case where an icon is associated with a port, changing the shape of that icon can convey information about the status of that particular port. Any additional light sources can be activated in the same manner described above with regards to primary light sources. Additional light sources used to change the shape of icons can also be selectively activated to emit light of a different color or brightness than primary light sources.

In one embodiment, icon 24 can be adjusted by changing its shape with the addition of icon portion 31 to convey status information about an associated headphone port. For example, when the associated headphone port is not outputting any signals, both icon 24 and icon portion 31 may be unilluminated. This mode can indicate to a user that the associated port is currently inactive. However, if the associated headphone port is outputting signals with a volume below a predetermined threshold, for example, icon 24 may be illuminated and icon portion 31 may be unilluminated. This mode can indicate to a user that the associated port is outputting audio signals. Finally, if the associated headphone port is outputting signals with a volume above a predetermined threshold, for example, both icon 24 and icon portion 31 may be illuminated. This mode can indicate to a user that the volume of the signals from the associated port may be dangerously high and the user may want to be careful when plugging in (or putting on) headphones. To further enhance the effect of this warning, icon portion 31 may be illuminated in a red color and/or blinking to convey the potential danger.

In another embodiment, the shape of icons can be adjusted to indicate when a particular port or function is disabled or inactive. For example, as shown in FIG. 3B, icon portion 32 can be used to indicate when an Ethernet port associated with icon 26 is disabled. In addition to or as an alternative to changing shape, an icon can change colors or become unilluminated to further indicate that an associated port is disabled.

In yet another embodiment, an icon's shape can be changed to indicate the direction that data is being transmitted through a port associated with the icon. For example, as shown in FIG. 3C, icon 27 can be associated with a video port in an electronic device and icon portions 33 and 34 can be used to indicate the flow of data through that video port. If the video port is enabled and connected to a video cable, icon 27 may be illuminated and icon portion 33 or icon portion 34 may also be illuminated to indicate which direction video data is being transmitted. For example, if data is being transmitted into the associated video port, icon portion 34 may be illuminated, and if data is being transmitted out of the associated video port, icon portion 33 may be illuminated.

The amount of illumination, color of illumination, and reflective properties of icon portions can be selectively adjusted in the same manner as primary icons. For example, as shown in FIG. 3A, icon portion 31 can increase in brightness to indicate an increase in volume of the audio signals coming from an associated headphone port.

Figure 3A:
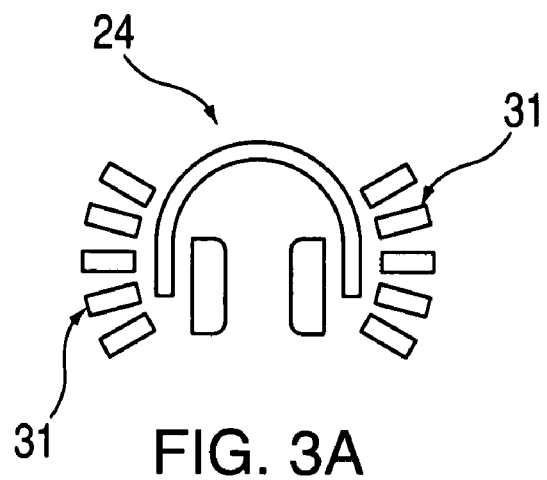
FIGS. 3A-3C are illustrations of additional adjustable icons in accordance with various embodiments of the present invention.
Figure 3B:
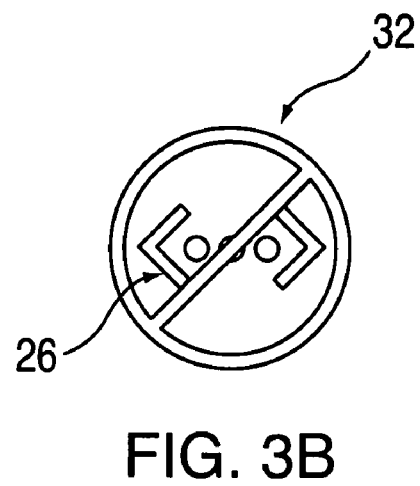
Figure 3C:
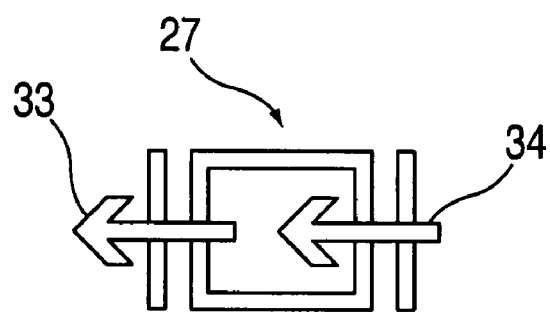

While FIGS. 3A-3C show various exemplary icon portions, it is to be understood that there are many different manners in which an icon's shape can change without deviating from the spirit and scope of the present invention. For example, the shape of an icon can change by adding a line under the primary icon.

Any characteristic of an icon or icon portion can be adjusted in combination with another characteristic. Certain combinations of characteristic adjustments can be used to convey information about an electronic device, a port on that device, or an accessory coupled to a port on that device. For example, an icon can change to a certain color and become brighter to indicate a particular type of port event.

Moreover, icons can be cyclically adjusted (e.g., flashing, cycling through colors). These cyclical adjustments can indicate the status of an electronic device, a port on the device, or an accessory coupled to a port on the device. For example, an icon may flash on and off to indicate that an accessory is in a standby mode. The rate at which adjustments are repeated can be indicative of the status of the electronic device, a port on the device, or an accessory coupled to a port on the device. For example, an icon can flash at a frequency that is proportional to the speed of data being transmitted through a port associated with the icon. These cyclical adjustments can help draw a user's attention to the icon and, therefore, may convey the represented information to the user more effectively.

After an icon has been adjusted, an electronic device can control how long the icon maintains its new mode. In one embodiment, an electronic device can maintain the icon's new mode indefinitely. Alternatively, an electronic device can maintain the icon's new mode until a predetermined amount of time has passed without any additional port events occurring. Once the predetermined amount of time has passed, the electronic device can adjust an icon to its default mode. For example, an electronic device (e.g., device 110 of FIG. 1) can brightly illuminate an icon (e.g., one of icons 124 of FIG. 1) for a predetermined amount of time and then dim the icon's illumination if no new port events occur. This configuration can save power used to illuminate icons and can be advantageous for portable, battery-powered devices, for example.

Figure 4:
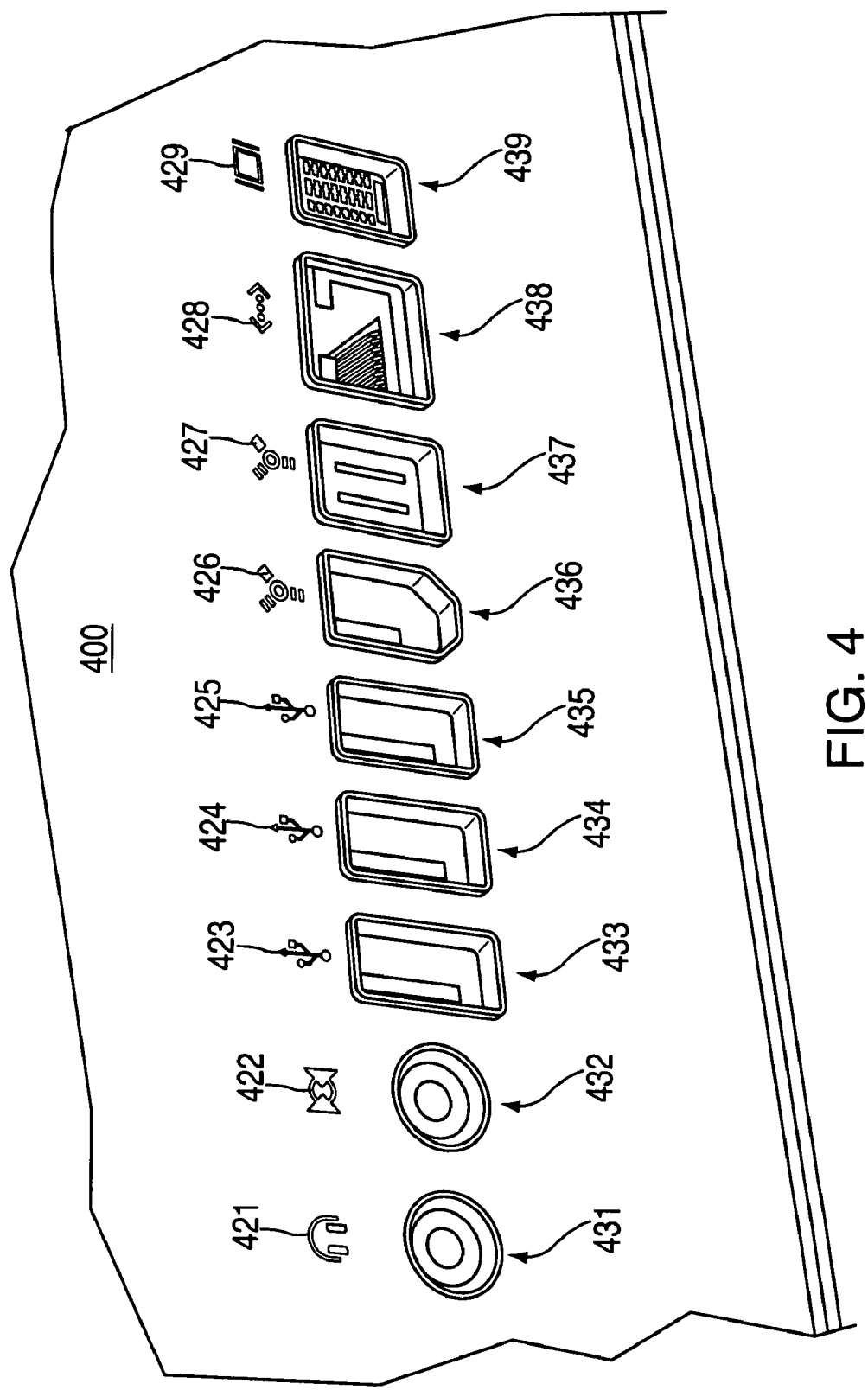
FIG. 4 is a perspective view of a portion of an electronic device in accordance with one embodiment of the present invention.

FIG. 4 is a perspective view of a portion of an illustrative electronic device 400 that is provided with adjustable icons according to one embodiment of the present invention. Device 400 may be a desktop computer and may include ports 431-439 for creating an electrical connection between device 400 and other electronic devices or accessories. Electronic device 400 can also include selectively adjustable icons 421-429 that can assist a user in connecting accessories to and disconnecting accessories from ports 431-439, respectively. For example, icon 421 can be associated with port 431 and the shape of icon 421 can be representative of the function of port 431 (e.g., the shape of headphones can represent the function of an audio port).

Figure 5A:
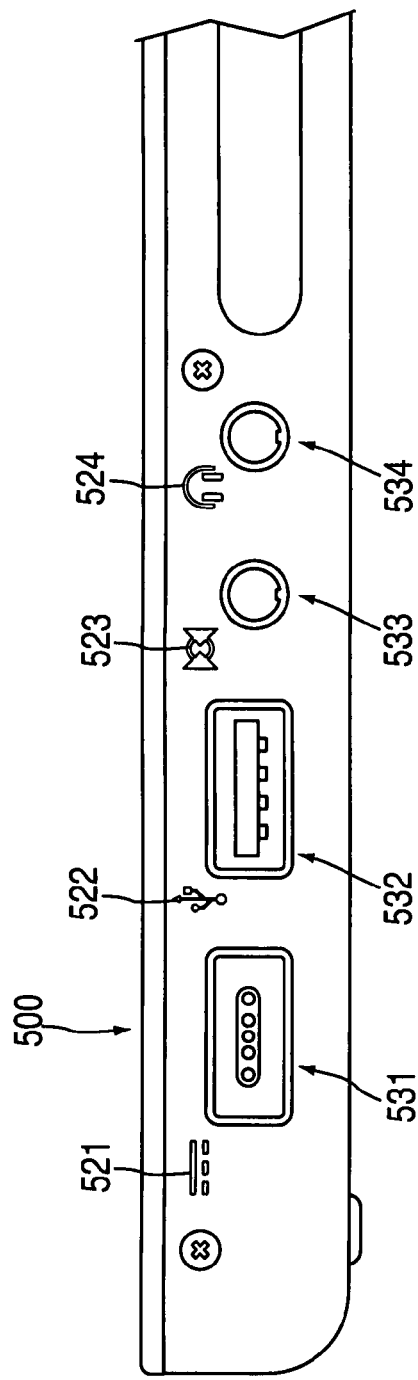
FIGS. 5A and 5B are side elevational views of portions of an electronic device in accordance with one embodiment of the present invention.
Figure 5B:
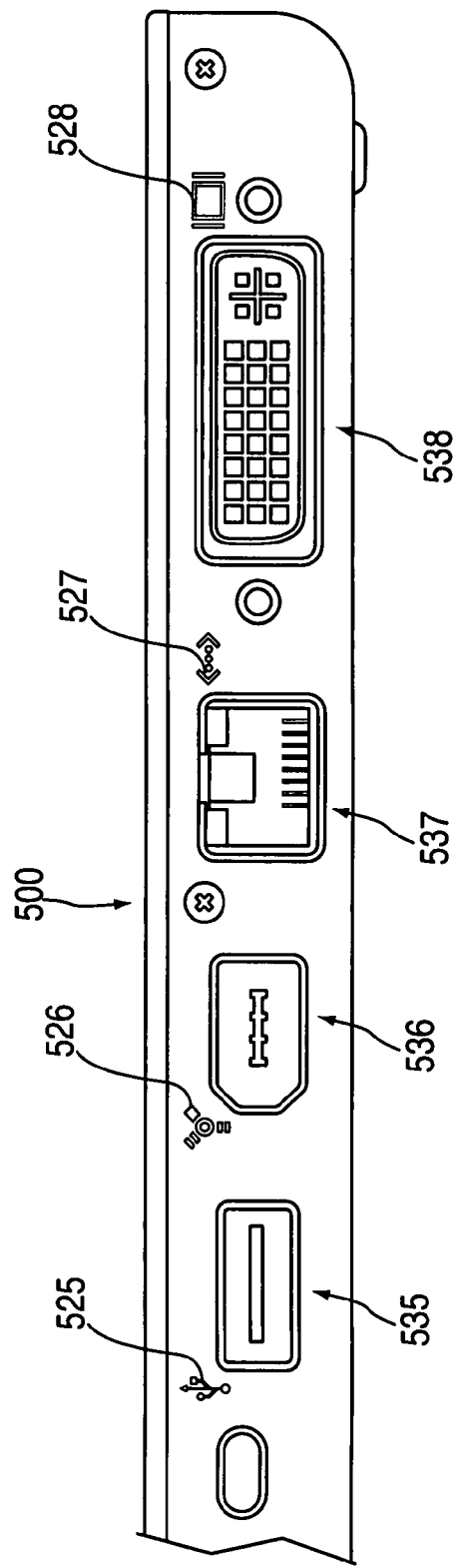

FIGS. 5A and 5B are, respectively, left and right elevational side views of a portion of an illustrative electronic device 500 that is provided with adjustable icons according to an embodiment of the present invention. Device 500 may be a laptop computer and may include ports 531-538 for creating an electrical connection between device 500 and other electronic devices or accessories. Device 500 can also include adjustable icons 521-528 that can be selectively adjusted to assist a user in connecting accessories to and disconnecting accessories from ports 531-538, respectively. For example, icon 521 can be associated with port 531 and the shape of icon 521 can be representative of the function of port 531 (e.g., the shape of headphones can represent the function of an audio port).

In accordance with one embodiment of the present invention, a user can provide a manual input that instructs an electronic device to selectively adjust one or more icons. A user can provide a manual input through a user interface or a remote control (see, e.g., user interface 130 and remote control 190 of FIG. 1).

A user interface can include one or more various input systems (e.g., a keyboard, mouse, touch-screen) to instruct a device how and when each of its icons are to be selectively adjusted. One or more of the input systems of a user interface can be integrated into the housing of a device, such as buttons 132 of user interface 130, for example. Additionally, one or more of the input systems of a user interface can be accessories that are already connected to a device through, for example, one or more ports (see, e.g., ports 122). A user interface can also include a graphical user interface (GUI) that provides a display system. A user interface can, for example, be configured to provide a user with detailed control over each icon (e.g., brightness, color, cycle), when they are to be adjusted, or general control over all the icons collectively.

Additionally, a remote control can be used to selectively adjust icons in accordance with an embodiment of the present invention. A remote control can communicate with an electronic device using any appropriate wired or wireless protocol (e.g., infrared, Bluetooth®, Wireless USB). A remote control can send instructions or commands to an electronic device's processor. A remote control can include one or more buttons (see, e.g., buttons 192 of remote control 190) that, when selected, can notify an electronic device that the user is attempting to connect or disconnect accessories to a specific type of port (e.g., an audio port). In response, the device can adjust one or more icons that are associated with that type of port. To selectively adjust all of the icons that are associated with ports on a device, a remote control can include another button (see, e.g., button 194 of remote control 190). A remote control can also include buttons that relate to inherent functions of an electronic device. For example, a user can select a button to turn a device on and off (see, e.g., button 196 of remote control 190).

Moreover, a user can employ a user interface or remote control to set options that control when and how an electronic device adjusts icons. For example, a user can configure a device to only respond to certain types of port events and to ignore others. A user can also configure a device to make a predetermined icon adjustment in response to a certain type of port event or system event. For example, a user can interface with a keyboard, individual buttons, or a mouse on a laptop computer to instruct the computer to illuminate all of its icons in bright green when the computer is first turned on.

In accordance with one embodiment of the present invention, an electronic device can be configured to determine that it is being moved in a manner indicative that a user may want to connect or disconnect an accessory to or from one or more ports of the device. To assist the user, the device can selectively adjust one or more icons that are associated with one or more of its ports. The device can adjust all of the icons associated with its ports, or the device can selectively adjust a portion of those icons based on the particular type of movement detected. The device can analyze the detected movement to determine that the user has attempted to connect an accessory to or disconnect an accessory from a certain group of ports (e.g., all of the ports on one side of the device). The device can then selectively adjust the icons that are associated with that group of ports.

Various mechanisms can be used to detect the movement of a device in accordance with the present invention. In accordance with one embodiment of the present invention, electronic device 110 can be provided with one or more movement detectors 116A, as shown in FIG. 1, for example, to detect movement of the device. For example, detector 116A may be an accelerometer. Micro electromechanical systems (MEMS) accelerometers can be used to measure the movement of a device in one or more axes, including tilt and rotation. Circuitry in an electronic device (e.g., detection circuitry 114) can measure the changes in accelerometer outputs. An electronic device can also be provided with circuitry that controls icon adjustment (e.g., control circuitry 114). By analyzing an accelerometer's output, circuitry in an electronic device can generate detailed movement information, including information related to the type of movement (e.g., linear movement, rotation, tilt) that has occurred and the extent of that movement (e.g., six inches, 35°). Various other types of detectors can be used to detect movement. For example, movement detector 116A may be a vibration detector, a magnetic compass, or a gyroscope. The detected movement information can be used to identify one or more ports which a user may be trying to access for either connecting or disconnecting one or more accessories. An electronic device can then selectively adjust one or more icons associated with those one or more identified ports (see, e.g., ports 122 and icons 124 of FIG. 1).

In accordance with one embodiment of the present invention, an electronic device can detect that it is being moved by monitoring sensors attached to joints, hinges, or exterior surfaces of the device. For example, movement detector 116A can be an electrical switch attached to a joint in device 110. When the joint is moved into a position that allows a user to connect an accessory to or disconnect an accessory from one or more ports of the device, the switch can change states (e.g., from open to closed or vice-versa). Circuitry in the device (e.g., detection circuitry 114) can measure the change in the state of the switch and can determine when a user is attempting to connect an accessory to or disconnect an accessory from a port. The device can subsequently adjust one or more icons that are associated with the one or more relevant ports. If a joint in the device has more than one possible position, a corresponding switch can include a different pole for each position. In such a configuration, the electronic device can identify a specific port or set of ports that a user may be attempting to connect an accessory to or disconnect an accessory from when the user moves the device to a particular position. The device can then adjust one or more icons that are associated with the identified ports.

Movement detector 116A can alternatively include a rotary or linear encoder attached to a joint such that the output of the encoder changes as the position of the joint changes. For example, an encoder can be a potentiometer that is provided such that the resistance of the potentiometer changes as the joint is moved. Compared to a switch, an encoder can provide a greater resolution in determining the position of a joint. An electronic device can include circuitry (e.g., detection circuitry 114) that monitors the output of the decoder to determine the position of the joint. This position information can then be used to selectively adjust one or more icons associated with ports that correspond to the determined joint position.

In accordance with one embodiment of the present invention, movement detector 116A can be a switch located on an exterior surface of the housing of a device (e.g., housing 120) in a location that causes the switch to be depressed during typical use. For example, such a switch can be placed on the bottom of an electronic device such that, during typical use, the switch is depressed by the surface on which the device rests. If a user moves the device with respect to that surface in an attempt to connect an accessory to or disconnect an accessory from one or more ports of the device, the switch may move and change states. In response to a state change, the device can then selectively adjust one or more icons associated with one or more of its ports. As an alternative to a switch on an exterior surface of a device's housing, movement detector 116A can include one or more strain gauges located on an exterior surface of the device's housing or incorporated into the device's housing. A strain gauge can be configured such that it is under a load during typical use. For example, a strain gauge attached to or incorporated into a device's housing (e.g., housing 120) can be under a constant load when the device is stationary. Circuitry in the device (e.g., detection and control circuitry 114) can monitor the output of the strain gauge. If a user moves the device in an attempt to connect an accessory to or disconnect an accessory from one or more of the device's ports, the output of the strain gauge can change and thereby trigger the device to adjust one or more of its icons that are associated with one or more of its ports (see, e.g., ports 122 and icons 124 of FIG. 1).

Figure 6:
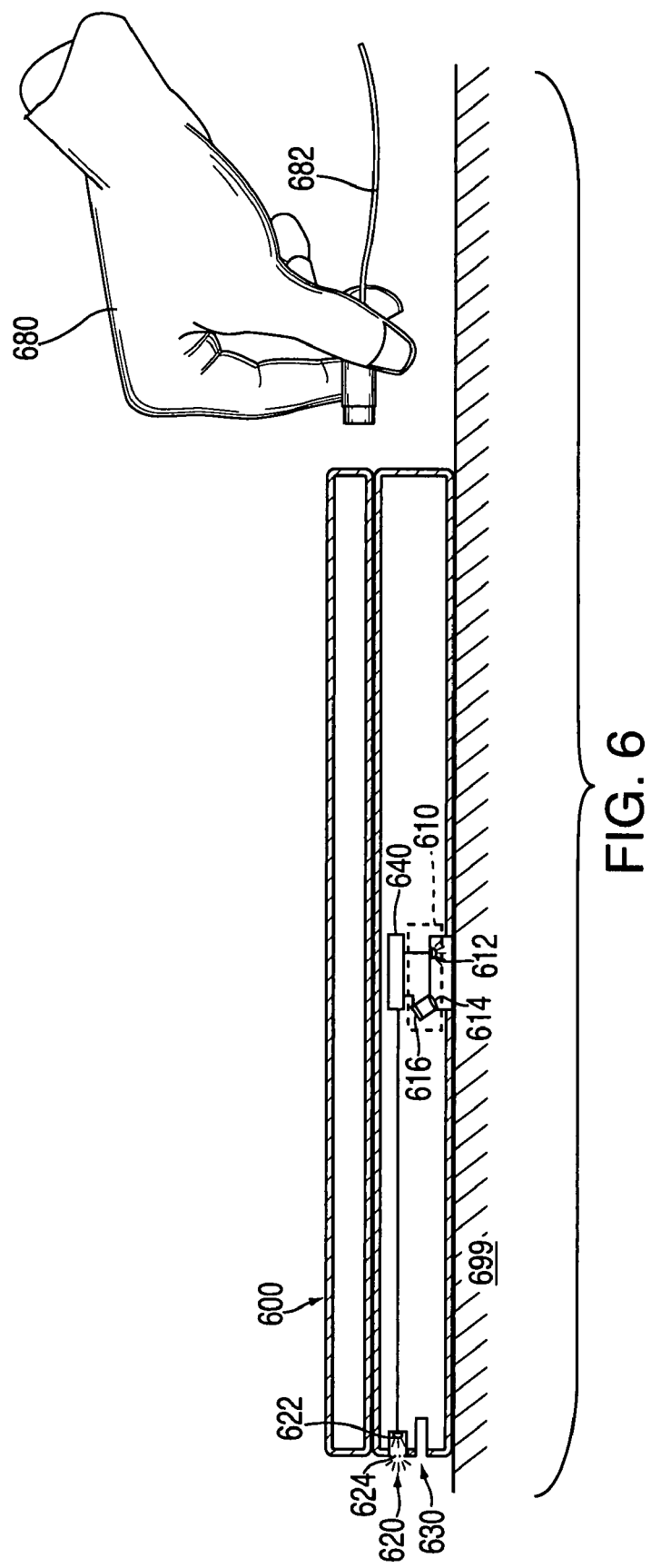
FIG. 6 is a simplified cross-sectional view of a user attempting to connect an accessory to an electronic device in accordance with one embodiment of the present invention.

In accordance with one embodiment of the present invention, movement detector 116A can be an optical system that detects when electronic device 110 is being moved (see e.g., optical system 610 of FIG. 6). For example, 1 movement detector 116A can be a detector similar to or the same as those used in optical computer mice. For example, optical systems and circuitry that are manufactured for use in optical computer mice can be incorporated into detector 116A. Detector 116A may be located on the bottom of housing 120 and aimed downward (see e.g., optical system 610 of FIG. 6) such that the detector can determine when the device moves in relation to a surface under the device.

FIG. 6 shows a cross-sectional view of an electronic device 600 that includes exemplary optical system 610 in accordance with one embodiment of the present invention. Device 600 can be placed on surface 699 such that optical system 610 is aimed at surface 699. Optical system 610 can include light source 612, lens 614, and detector 616. Optical system 610 can be similar to or the same as the optical systems typically used in optical computer mice. Light source 612 can be an infrared light emitting diode (LED), for example. Light emitted from light source 612 can reflect off of surface 699 and pass through lens 614. Lens 614 can focus the light reflected off of surface 699 onto detector 616. Detector 616 can be an array of photodiodes, for example. Detector 616 can be selected to detect light of the same wavelength as the light that is emitted from source 612. For example, if light source 612 is an infrared light source, detector 616 may be an array of infrared sensors. By measuring the light reflected off of surface 699, detector 616 can generate data about surface 699.

Device 600 can also include detection and control circuitry 640. Optical system 610 and light source 622 can be electrically coupled with circuitry 640. Detection and control circuitry 640 can, for example, be provided on a processor, a field-programmable gate array, an application-specific integrated circuit, or a combination of individual logic components. At least a portion of detection and control circuitry 640 may be similar to or the same as circuitry typically used in optical computer mice (e.g., the portion of circuitry 640 that reads the output of optical system 610 may be the same as circuitry from an optical computer mouse).

Detection and control circuitry 640 in device 600 can analyze subsequent data generated by detector 616 to determine if device 600 is moving relative to surface 699. Any movement of device 600 may indicate that a user is attempting to connect an accessory to or disconnect an accessory from one of the device's ports. Accordingly, upon detection of movement of device 600 by circuitry 640, circuitry 640 can activate light source 622. For example, light source 622 can be an LED that emits visible, colored light. Light from light source 622 can pass through screen 624. Screen 624 can be microperforations, for example, arranged in a shape to form an icon, as described above. Light from light source 622 that passes through screen 624 can illuminate icon 620.

As shown in FIG. 6, for example, a user 680 can hold an accessory 682 that he or she intends to connect to port 630 on the other side of device 600, adjacent icon 620. User 680 may therefore rotate device 600 to connect accessory 682 to port 630. Detection circuitry 640 can analyze data from detector 616 and determine that device 600 is moving. Circuitry 600 can subsequently activate light source 622. Once user 680 rotates device 600 to the point that port 630 is facing the user, icon 620 may be illuminated such that the user's attention is drawn to the area of port 630 adjacent icon 620. This can save the user time when searching for the port of device 600.

It is to be understood that, although FIG. 6 shows an active optical system with a source and a detector, a passive optical system can be used without deviating from the spirit and scope of the present invention. For example, an ambient light detector can be placed on the bottom of an electronic device and any detected ambient light may change if the device is lifted off of a surface in an attempt to connect or disconnect an accessory, for example.

In accordance with one embodiment of the present invention, an electronic device can monitor a user's eyes or head to selectively adjust icons for assisting the user. For example, a device can be provided with a detector that includes one or more cameras aimed at a user's face. The one or more cameras can generate and analyze images of a user's face to determine what the user is looking at. Such analysis can be performed using algorithms like those developed by Seeing Machines of Canberra, Australia, for example, and can be used to selectively adjust one or more icons associated with the ports that a user is looking at. For example, using a camera, a laptop computer can recognize that a user is not looking at the laptop screen but rather along a side of the laptop's base and can then selectively illuminate one or more icons in that area.

In accordance with one embodiment of the present invention, an electronic device can include one or more function detectors and can selectively adjust icons based on what function the device is performing. A function detector can determine if a device is performing a function that requires an input signal from one or more particular port or that requires one or more particular accessory to be connected to or disconnected from one or more particular port. For example, function detector 116B (see, e.g., FIG. 1) can be incorporated into processor circuitry 112 of device 110 such that function detector 116B can determine what functions the device is performing and whether or not the functions involve one or more of ports 122. A function detector can also be provided on circuitry that is not part of a device's processor circuitry.

If a function detector determines that the device is performing a function that involves one or more ports, the device can selectively adjust one or more icons associated with the one or more relevant ports. For example, if an electronic device is executing user-initiated software that is typically used with a USB accessory, the device can illuminate the icons associated with USB ports. The icon or icons can flash to further draw a user's attention to those USB ports.

If an electronic device is performing a function that requires more than one accessory to be connected to the device in a certain order, the device can adjust the icon associated with the first accessory's port until that accessory is connected and can then subsequently adjust each relevant icon for the other accessories. For example, if a computer user initiates an installation program that requires an Ethernet connection exist before a Firewire accessory may be connected to a port of the device, circuitry (e.g., function detector 116B) can detect this, and an icon associated with an Ethernet port can be illuminated until an active Ethernet cable is coupled thereto. Subsequently, an icon associated with a Firewire port can be illuminated until the appropriate Firewire accessory is coupled thereto.

In accordance with one embodiment of the present invention, an electronic device can include one or more proximity detectors and can selectively adjust icons according to detection of a nearby user or accessory. In one embodiment, a proximity detector can detect when a user is touching a particular part of a device's housing (e.g., by using a capacitive or resistive touch sensor). For example, exterior housing 120 of device 110 can include sensors or detectors 116C that can detect contact with human skin. Detectors 116C can be incorporated into housing 120 near ports 122 such that device 110 can determine when a user is trying to connect an accessory to or disconnect an accessory from those ports. Detectors 116C can also be located within housing 120 such that the detectors can still determine when a port event is occurring.

In accordance with one embodiment of the present invention, a proximity detector can detect when an object (e.g., a user or accessory) is within a certain proximity thereof. For example, device 110 can be provided with proximity detectors 116C that may be aimed at the area near one or more of ports 122. The output of proximity detectors 116C can be monitored by detection circuitry 114 to identify when an object is proximal thereto.

Proximity detectors 116C can also be used to determine when an object proximal to a detector is moving. For example, detection circuitry 114 may compare sequential outputs from proximity detectors 116C in order to detect any changes that indicate movement. Accordingly, proximity detectors 116C may also be referred to as movement or motion detectors because the detectors can determine when an object proximal to a detector is moving. It should be noted that this type of movement or motion detector is different from movement detector 116A because detectors 116C detect movement of an object proximal to one of the detectors but not necessarily the movement of the device that contains the detectors.

Signals from proximity detector 116C can be used to determine that a user is attempting to connect an accessory to or disconnect an accessory from those ports. For example, if a proximity sensor configured to sense the area proximal to a video port is activated, a device can illuminate the one or more icons associated with that port. Proximity detectors 116C can be active or passive sensors.

Active proximity sensors can emit energy of a particular wavelength (e.g., infrared or ultrasonic) and can detect any reflected energy. The amount of reflected energy can be used to determine if any objects are proximal to the sensor.

Passive proximity sensors can measure the energy incident on a detector without necessarily emitting any energy. Passive sensors do not typically use much power, and therefore may be advantageous for portable, battery-powered electronic devices. For example, passive sensors can measure the amount of light or infrared energy incident on a detector near a port. The amount of energy naturally incident upon a detector depends on the environment. Therefore, passive sensors can recognize changes in energy levels that may indicate when an object is proximal to a detector. In the case of ambient light sensors, an object moving directly in front of the detector may cause a shadow to pass over the detector and can result in a decrease in the amount of measured ambient light. If a passive infrared sensor is used, the heat emitted from a user's hand in front of a detector can cause an increase in the measured infrared energy, for example.

FIG. 7 shows a cross-sectional view of a portion of an electronic device 700 including selectively adjustable icons in accordance with one embodiment of the present invention. Device 700 includes port 730 and an active sensor (see e.g., proximity detector 116C of FIG. 1) for detecting the presence or movement of objects proximal to port 730. As part of the active sensor, device 700 may include optical system 710 which can further include energy source 712, lens 714, and detector 716.

It should be noted that many of the same components of optical system 610 of FIG. 6 may be used in the proximity sensor arrangement of FIG. 7. For example, optical system 710 may be similar to or the same as optical system 610. However, in some embodiments, lens 714 may have a different focal length such that more distant movement can be detected (in comparison to lens 614). Like optical system 610, a portion or all of optical system 710 can be similar to or the same as the optical systems typically used in optical computer mice. For example, light source 712 and detector 716 may be similar to the components used in optical computer mice, but lens 714 may be different so that more distant movement can be detected (see above discussion about focal length).

Energy source 712 can be an infrared emitter, for example. Lens 714 can be aimed at a space proximal to port 730 and can focus any energy reflected from that space onto detector 716. Detector 716 can measure the amount of this reflected energy.

Detection and control circuitry 740 can control the operation of energy source 712 and can read the output of detector 716. Detection and control circuitry 740 can, for example, be provided on a processor, a field-programmable gate array, an application-specific integrated circuit, or a combination of individual logic components. By analyzing the amount of reflected energy, circuitry 740 can determine if an object is proximal to port 730. Circuitry 740 can compare the amount of reflected energy with, for example, a predetermined threshold indicating that an object is present.

Circuitry 740 may also determine if an object proximal to port 730 is moving by comparing the current amount of reflected energy with previous amounts of reflected energy. For example, if the amount of reflected energy significantly decreases, circuitry 740 may determine that an object was removed from the area proximal to port 730. Like circuitry 640, at least a portion of detection and control circuitry 740 may be similar to or the same as the circuitry typically used in optical computer mice (e.g., the portion of circuitry 740 that reads the output of optical system 710 may be the same as circuitry from an optical computer mouse). Upon detecting the presence of an object or movement proximal to port 730, circuitry 740 can adjust (e.g., illuminate) an icon 720 associated with port 730. This adjustment can draw a user's attention to icon 720 and therefore port 730.

Alternatively, an electronic device can be provided with a proximity sensor that is incorporated into the interior of a port. For example, an emitter and lens can be located on the back wall of a port (e.g., wall of a port internal to the port and proximal to the device) and pointed towards the opening at the front of the port (e.g., the opening facing away from the device). This can be advantageous because such a configuration may not require an additional opening or window for an emitter or detector.

In accordance with one embodiment of the present invention, a proximity detector can detect when an accessory is within a certain proximity thereof and the type of the proximal accessory. For example, electronic system 100 of FIG. 1 can be provided with a radio-frequency identification (RFID) system to selectively adjust icons 124 according to the proximity of any accessories 180. Proximity detector 116C can be an RFID reader, and RFID transponders 182 can be incorporated into accessories 180. Information about an accessory (e.g., what type of ports it can connect with) can be stored on the accessory's RFID transponder. When one of accessories 180 is proximal to device 110, proximity detector 116C can detect the presence of RFID transponder 182 and can read the information stored thereon. Detection and control circuitry 114 can use this information to identify which of ports 122 accessory 180 can connect with and to adjust at least one of icons 124 associated with the identified port. For example, if an RFID reader identifies an RFID transponder corresponding to a video cable, the electronic device may dim any icons associated with irrelevant ports and may brighten any icons associated with a video port. This selective adjustment can draw a user's attention to the correct port or ports and, therefore, assist the user in connecting the accessory (e.g., video cable) to the electronic device.

FIG. 8 shows a cross-sectional view of electronic system 800 in accordance with one embodiment of the present invention. System 800 can include electronic device 801 and accessory 851. It should be noted that accessory 851 is not necessarily drawn to scale. Accessory 851 can include RFID transponder 860 and data bus 870. Accessory 851 and data bus 870 can be configured to couple with a specific type of port on device 801.

RFID transponder 860 can include RFID circuitry 862 and RFID antenna 864. RFID antenna 864 can be electrically coupled with RFID circuitry 862. RFID antenna 864 can receive RFID signals for RFID circuitry 862 to process, and can transmit RFID signals generated by RFID circuitry 864. RFID circuitry 862 can store an identification code that indicates the type of accessory 851 (e.g., USB, ⅛" audio, or Firewire cable). RFID transponder 860 can transmit this identification code to electronic device 801.

Device 801 can include RFID reader 810, icons 821-824, ports 831-834, and detection and control circuitry 840. RFID reader 810 can include RF detection circuitry 812 and RF antenna 814. RF antenna 814 can be electrically coupled to RF circuitry 812. RF antenna 814 can transmit signals that are generated by RF circuitry 812, such as, for example, signals for communicating with RFID transponders. RF antenna 814 can also receive RF signals, such as, for example, signals from RFID transponders. Received RF signals can be processed by RF circuitry 812 and output to detection and control circuitry 840.

Detection and control circuitry 840 can control the functions of RFID reader 810 and icons 821-824. Detection and control circuitry 840 can, for example, be provided on a processor, a field-programmable gate array, an application-specific integrated circuit, or a combination of individual logic components. Detection circuitry 840 can monitor data from RFID reader 810 and can recognize when an identification code is received by antenna 814. Upon recognizing a received identification code, detection circuitry 840 can associate the identification code with a particular type of accessory and can determine the appropriate port or ports for that type of accessory. Control circuitry 840 can then selectively adjust one or more icons associated with the appropriate port or ports. The associated icon can, for example, be illuminated in a flashing pattern.

In one embodiment, accessory 851 can be a Firewire cable, port 832 can be a Firewire port, and icon 822 can be an associated Firewire icon. RFID transponder 860 can transmit a Firewire identification code to RFID reader 810. Control circuitry 840 can recognize the identification code and can selectively adjust icon 822 to draw a user's attention to port 832. Control circuitry 840 may also dim the brightness of icons 821, 823, and 824.

Although FIG. 8 shows an RFID transponder at an end of accessory 851, it is to be understood that an RFID transponder can be located anywhere in or on an accessory without deviating from the spirit and scope of the present invention. Moreover, RFID transponders can be incorporated into adhesive labels that can be applied to any portion of an accessory.

Figure 9:
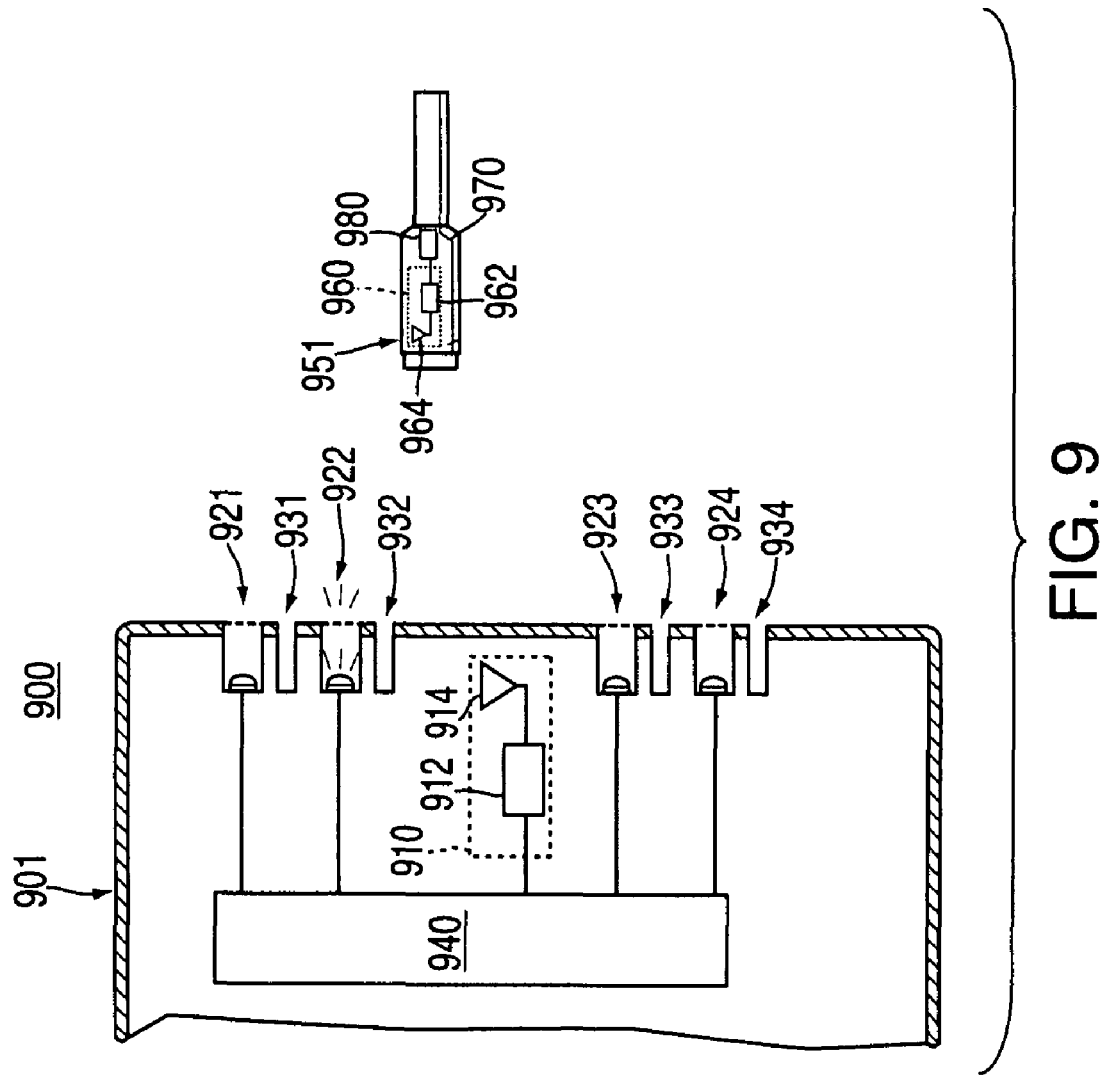
FIG. 9 is a simplified cross-sectional view of another illustrative electronic system that include an electronic device and an accessory in accordance with one embodiment of the present invention.

FIG. 9 shows a cross-sectional view of electronic system 900 in accordance with one embodiment of the present invention. System 900 can include electronic device 901 and accessory 951. It should be noted that accessory 951 is not necessarily drawn to scale. Accessory 951 can include communications circuitry 960, data bus 970, and user interface circuitry 980. Accessory 951 and data bus 970 can be configured to couple with a specific type of port on device 901.

User interface circuitry 980 can accept instructions, commands, or notifications from a user. User interface circuitry 980 can, for example, include a mechanical button that a user can manipulate. Alternatively, user interface circuitry 980 can be a capacitive touch sensor on an external surface of accessory 951. A user can employ user interface circuitry 980 to indicate when he or she is attempting to connect or disconnect accessory 951 to or from a port on electronic device 901.

Communications circuitry 960 can include communications control circuitry 962 and antenna 964. Communications circuitry 960 can communicate wirelessly (e.g., via Bluetooth, 802.11, or Wireless USB) with devices and other accessories. Communications control circuitry 962 can store an identification code that indicates the type of accessory 951 (e.g., USB, ⅛" audio, or Firewire cable). Communications circuitry 960 can transmit this identification code to electronic device 901. Communications circuitry 960 can be electrically coupled with user interface circuitry 980. Communications circuitry 960 can receive a signal from user interface circuitry 980 that controls when communications circuitry 960 transmits the identification code, for example.

Electronic device 901 can include communications circuitry 910, icons 921-924, ports 931-934, and detection and control circuitry 940. Communications circuitry 910 can include communications control circuitry 912 and antenna 914. Antenna 914 can be electrically coupled to communications control circuitry 912. Antenna 914 can receive wireless signals, such as, for example, signals from communications circuitry 960. Received wireless signals can be processed by communications control circuitry 912 and output to detection and control circuitry 940.

Detection and control circuitry 940 can control the functions of communications circuitry 910 and icons 921-924. Detection and control circuitry 940 can, for example, be provided on a processor, a field-programmable gate array, an application-specific integrated circuit, or a combination of individual logic components. Circuitry 940 can monitor data from communications circuitry 910 and can recognize when an identification code is received. Upon recognizing a received identification code, detection circuitry 940 can associate the identification code with a particular type of accessory and can determine the appropriate port or ports for that type of accessory. Control circuitry 940 can then selectively adjust one or more icons associated with the appropriate port or ports. The associated icon can, for example, be illuminated in a flashing pattern.

In one embodiment, accessory 951 can be a Firewire cable, port 932 can be a Firewire port, and icon 922 can be a Firewire icon associated with port 932. A user attempting to connect accessory 951 to electronic device 901 can provide an input through user interface circuitry 980. In response to receiving an input signal from a user via interface circuitry 980, communications circuitry 960 can transmit an identification code (e.g. a Firewire identification code) to communications circuitry 910. Control circuitry 940 can recognize the identification code and can selectively adjust icon 922 to draw a user's attention to port 932. Control circuitry 940 may also dim the brightness of icons 921, 923, and 924.

Although FIG. 9 shows user interface circuitry and communications circuitry at an end of accessory 951, it is to be understood that user interface circuitry and communications circuitry can be located anywhere in an accessory without deviating from the spirit and scope of the present invention.

FIG. 10 shows an illustrative flowchart of method 1000 for assisting a user of an electronic device in accordance with one embodiment of the present invention. The electronic device can have one or more ports for coupling with accessories and one or more icons associated with those one or more ports. At step 1010, it can be determined that a port event related to a port on the electronic device is occurring. It can be determined that a port event is occurring by accepting an instruction from the user. Such an instruction can, for example, be accepted through a user interface on the electronic device or through a user interface on an accessory. Such a user interface can be a physical mechanism (e.g., a button) and/or a virtual interface (e.g. a software program).

Determining that a port event is occurring can include determining that the electronic device is being moved. To determine that the electronic device is being moved, the output of an accelerometer, strain gauge, switch, or encoder can be read. An optical sensor can also be used to determine that the electronic device is being moved. Such an optical sensor can be located on the bottom of the electronic device and aimed at the area under the device, for example.

It can also be determined that a port event is occurring by determining that the user is attempting to perform a function that requires connecting or disconnecting an accessory. For example, if a user is attempting to execute a software program that requires a particular accessory, it can be determined that the user is also attempting to connect that accessory.

Determining that a port event is occurring can include determining that an object is proximal to a port on the electronic device, for example, by using a proximity detector. Determining that a port event is occurring can also include using an RFID system to identify the presence of an accessory.

At step 1020, one or more icons on the electronic device can be adjusted in response to determining that a port event related to the one or more ports on the device is occurring. The one or more icons can, for example, be associated with one or more ports on the electronic device. Adjusting one or more icons can include selectively adjusting one or more icons associated with the one or more ports related to the port event. For example, if it has been determined that a user is attempting to connect an accessory to a particular port, an icon associated with that particular port can be selectively adjusted.

It is to be understood that the principles of the present invention are not limited to the electronic devices described in the discussions above and can be applied to any type of electronic device or system.

It is to be understood that the foregoing is only illustrative of the principles of the invention, and that various modifications can be made by those skilled in the art without departing from the scope and spirit of the invention, and the present invention is limited only by the claims that follow.

What is claimed is:

1. A method for assisting a user of an electronic device having a housing, a port and an icon, the method comprising:
   determining that a port event related to the port is occurring by at least determining that the housing of the electronic device is being physically moved; and
   adjusting the icon in response to the determining, wherein the adjusting assists the user with accessing the port.

2. The method of claim 1, wherein the port event comprises a change in the status of the port.

3. The method of claim 1, wherein the port event comprises the user attempting to connect or disconnect an accessory to or from the port.

4. The method of claim 1, wherein the determining that a port event is occurring comprises accepting an instruction from the user.

5. The method of claim 1, wherein the determining that the housing of the electronic device is being physically moved comprises at least one step selected from the group consisting of:
   reading an output of an accelerometer;
   reading an output of a strain gauge;
   reading an output of a switch;
   reading an output of a rotary or linear encoder;
   reading an output of a vibration detector;
   reading an output of a magnetic compass; and
   reading an output of a gyroscope.

6. The method of claim 1, wherein the determining that the housing of the electronic device is being physically moved comprises reading an output of an optical sensor.

7. The method of claim 1, wherein the determining that a port event is occurring comprises determining that the user is attempting to perform a function that requires connecting an accessory to or disconnecting an accessory from the port.

8. The method of claim 1, wherein the determining that a port event is occurring comprises determining that an object is proximal to the port.

9. The method of claim 1, wherein the determining that a port event is occurring comprises using an RFID system to identify the presence of an accessory.

10. The method of claim 1, wherein the icon includes a light source, and wherein the adjusting comprises adjusting the brightness of the light source.

11. The method of claim 1, wherein the icon includes a plurality of differently colored light sources.

12. An electronic device comprising:
a housing;
one or more ports;
one or more icons operable to assist a user with accessing the one or more ports;
sensor circuitry operable to detect a port event related to at least one of the one or more ports by at least determining that the housing is being physically moved; and
control circuitry coupled to the one or more icons and the sensor circuitry, wherein the control circuitry is operable to adjust at least one of the one or more icons in response to the port event detected by the sensor circuitry.

13. The electronic device of claim 12, wherein the at least one of the one or more icons comprises a light source with an adjustable brightness.

14. The electronic device of claim 12, wherein the at least one of the one or more icons comprises a plurality of differently colored light sources.

15. The electronic device of claim 12, wherein the port event comprises accepting an instruction from the user of the electronic device.

16. The electronic device of claim 12, wherein the port event comprises a change in the status of the at least one of the one or more ports.

17. The electronic device of claim 12, wherein the port event comprises the user attempting to connect an accessory to or disconnect an accessory from the at least one of the one or more ports.

18. The electronic device of claim 12, wherein the sensor circuitry comprises at least one sensor from the group consisting of:
an accelerometer;
a strain gauge;
a switch;
a rotary or linear encoder;
a vibration detector;
a magnetic compass; and
a gyroscope.

19. The electronic device of claim 12, wherein the sensor circuitry comprises at least one proximity or motion detector.

20. The electronic device of claim 19, wherein the at least one proximity or motion detector comprises:
an energy source; and
an energy detector, wherein the energy source and the energy detector are aimed at an area proximal to the at least one of the one or more ports.

21. The electronic device of claim 19, wherein the proximity or motion detector includes an optical system that was fabricated to be part of an optical computer mouse.

22. The electronic device of claim 19, wherein the sensor circuitry includes circuitry that was fabricated to be part of an optical computer mouse.

23. The electronic device of claim 12, wherein the sensor circuitry comprises an RFID reader.

24. A system for assisting a user of an electronic device, the system comprising:
an accessory, wherein the accessory comprises:
a user interface operable to receive, independent of any interaction with the electronic device, a tactile input from the user; and
accessory communications circuitry operable to broadcast a code that identifies the type of port that the accessory is configured to be coupled to in response to receiving the tactile input; and
the electronic device, wherein the electronic device comprises:
one or more ports;
one or more icons operable to assist the user with accessing the one or more ports;
sensor circuitry operable to determine that the user is attempting to connect or disconnect the accessory to or from at least one of the one or more ports; and
control circuitry coupled to the one or more icons and the sensor circuitry, wherein the control circuitry is operable to adjust at least one of the one or more icons in response to the determination of the sensor circuitry.

25. The system of claim 24, further comprising:
a remote control device that the user can interface with to notify the electronic device that the user is attempting to connect or disconnect the accessory to or from the at least one of the one or more ports.

26. The system of claim 24, wherein the accessory comprises an RFID transponder, and wherein the sensor circuitry comprises an RFID reader.

27. The system of claim 26, wherein the RFID transponder is operable to broadcast a code that identifies the type of port that the accessory is configured to be coupled to.

28. The system of claim 26, wherein the RFID reader is operable to receive a code, and wherein the control circuitry is operable to adjust the at least one of the one or more icons based on the code.

29. The system of claim 24, wherein the sensor circuitry comprises sensor communications circuitry that is operable to receive a code, and wherein the control circuitry is operable to adjust the at least one of the one or more icons based on the code.

30. The method of claim 1, wherein the icon is adjacent to the port.

31. The electronic device of claim 12, wherein each of the one or more icons is adjacent to a respective one of the one or more ports.

32. The system of claim 24, wherein each of the one or more icons is adjacent to a respective one of the one or more ports.

33. The method of claim 1, wherein the determining that the housing of the electronic device is being physically moved comprises determining that the entire electronic device is being physically moved.

34. The electronic device of claim 12, wherein the sensor circuitry is further operable to detect a port event related to at least one of the one or more ports by at least determining that the entire electronic device is being physically moved.

* * * * *

UNITED STATES PATENT AND TRADEMARK OFFICE
CERTIFICATE OF CORRECTION

| | | |
|---|---|---|
| PATENT NO. | : 7,898,397 B2 | Page 1 of 1 |
| APPLICATION NO. | : 11/818089 | |
| DATED | : March 1, 2011 | |
| INVENTOR(S) | : Duncan R Kerr et al. | |

It is certified that error appears in the above-identified patent and that said Letters Patent is hereby corrected as shown below:

In column 11, line 64, delete "1 movement" and insert -- movement --, therefor.

Signed and Sealed this
Twenty-second Day of November, 2011

David J. Kappos
*Director of the United States Patent and Trademark Office*